July 17, 1928.                    M. T. KAMERICK                    1,677,639
TRACTOR HITCH
Filed Sept. 12, 1927
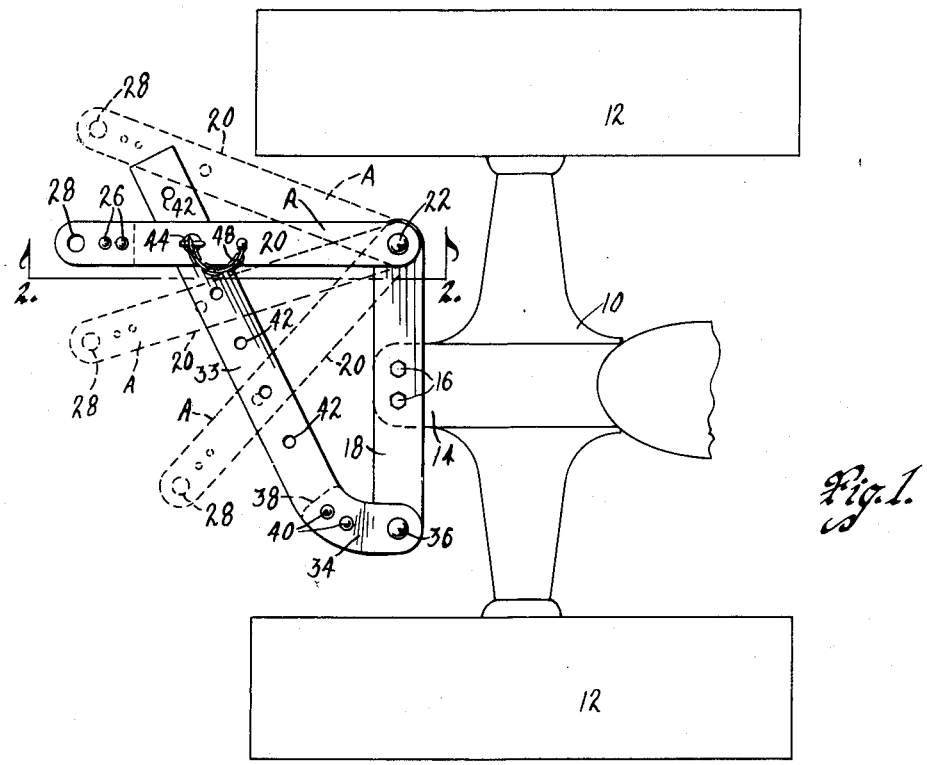
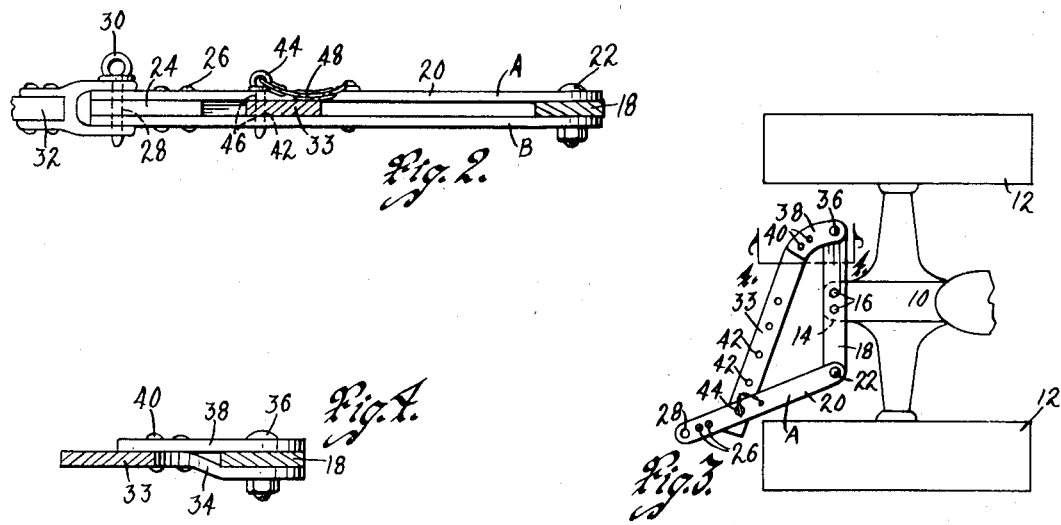
Witness
L. F. Sandberg
Inventor
Martin T. Kamerick
by Bair & Freeman Attorneys Patented July 17, 1928.

1,677,639

UNITED STATES PATENT OFFICE.

MARTIN T. KAMERICK, OF PELLA, IOWA.

TRACTOR HITCH.

Application filed September 12, 1927. Serial No. 218,975.

The object of my invention is to provide a tractor hitch of simple, durable and comparatively inexpensive construction.

More particularly it is my object to provide a tractor hitch adapted to be secured to a tractor frame for connecting various implements such as corn harvesters, binders, harrows and the like to the tractor, the hitch permitting adjustment whereby the angle of the implement drawn by the tractor, may be varied so that the line of draft will be such as to insure proper use of the implement.

Still a further object is to provide a draw bar forming a part of the hitch which may be swung to various positions so that the implement being drawn is pulled in line with the center of the tractor or offset on each side therefrom.

With these and other objects in view, my invention consists in the construction, arrangement and combination of the various parts of my device, whereby the objects contemplated are attained, as hereinafter more fully set forth, pointed out in my claim and illustrated in the accompanying drawings, in which:—

Figure 1 is a top plan view of my improved tractor hitch installed and connected to a tractor, various positions of the draw bar being shown in dotted lines.

Figure 2 is a sectional view taken on the line 2—2 of Figure 1.

Figure 3 is a top plan view similar to Figure 1 with the parts upside down for placing the draw bar at an angle relative to the center line of the tractor; and Figure 4 is a detail sectional view taken on the line 4—4 of Figure 3.

In the accompanying drawings, I have used the reference numeral 10 to indicate generally a tractor having a pair of traction wheels 12. The tractor 10 includes a rearwardly projecting lug or the like 14, whereby a hitch may be secured thereto.

In the lug 14 as shown in the drawings, there is provided a pair of spaced openings for receiving a pair of bolts or the like 16 whereby a hitch may be secured to the lug 14 and in turn, to the tractor 10.

In the embodiment of my tractor hitch, I have provided a bar 18 adapted to rest upon the lug 14 and be secured thereto by the bolts 16. The bar 18 is arranged at substantially right angles to the center line or draft line of the tractor. The bar 18 projects on each side of the lug 14 substantially the same distance.

A draw bar 20 is pivotally connected to one end of the bar 18 by means of a bolt or the like 22. The draw bar 20 is formed of a pair of similar members A and B which are spaced apart a sufficient distance so as to straddle one end of the bar 18. The other or free ends of the bars A and B of the draw bar 20, are spaced apart by a filler block 24 secured to the bars A and B by means of rivets or the like 26.

A central opening 28 is formed in the outer free end of the draw bar 20 and may receive a pin or the like 30 whereby the draw bar 20 may be connected to a tongue 32 of any farm implement or other device which may be drawn behind a tractor.

In order to prevent pivotal movement of the draw bar 20 and to secure a proper line of draft, I provide a connecting link 33 having one end curved as at 34. The curved end 34 is connected to the free end of the bar 18 by means of a bolt or the like 36.

In order to form a substantial connection between the link 33 and the bolt 36, I provide a separate piece or strap 38 which is riveted to the link 32 by means of rivets 40 which straddle the end of the bar 18 as clearly shown Figure 4 of the drawings. The strap or additional piece 38 provides a positive connection between the link 33 and the bar 18.

The link 33 is formed with a plurality of spaced openings 42 which may receive a locking pin 44. The locking pin 44 is arranged to project through a pair of aligned openings 46 formed in the members A and B of the draw bar 20. The link 33 which is pivotally connected to the bar 18, has its free end inserted in the space between the members A and B of the draw bar 20.

Any one of the openings 42 may be brought into registry with the openings 46 in the draw bar 20 and by inserting the pin 44 therethrough, the parts will assume a rigid locked position. The draw bar 20 may be moved to various positions as shown in Figure 1 of the drawings thus providing a hitch that will give a line of draft where it is best adapted for the particular job to be done.

In Figure 3 of the drawings, I have shown the hitch in reversed or upside down position so that the draw bar is at a considerable angle relative to the center line of the tractor proper. The pin 44 is connected to a chain or the like 48, which in turn is fixed to the draw bar 20 so that the pin will always be accessible for use.

My tractor hitch is formed of strap iron so arranged as to be easily and quickly assembled and to provide a very substantial and rigid connection.

It will be noted that the opening 28 is well behind the tractor wheels 12 at all positions of adjustment of the draw bar A. My hitch therefore is a safety hitch as it eliminates all danger of a device which is being pulled by the tractor becoming entangled in the traction lugs of the wheels 12. I find this to be the case even when making a comparatively sharp turn either to the right or left.

Some changes may be made in the construction and arrangement of the parts of my device without departing from the real spirit and purpose of my invention, and it is my intention to cover by my claim, any modified forms of structure or use of mechanical equivalents, which may be reasonably included within its scope.

I claim as my invention:

A tractor hitch comprising a bar adapted to be secured to a fixed portion of a tractor at right angles to the line of draft of the tractor, a draw bar pivotally mounted upon one end of said first bar, said draw bar being formed of two spaced similar members straddling said first bar at one end, a filler block between the other ends of said members, said draw bar having an opening therein for connection to an implement to be drawn, a link pivoted at one end to the other end of said first bar, said link having one portion bent at an angle and having another portion slidably mounted between the two members of said draw bar, said link having a plurality of spaced openings therein adapted to selectively register with aligned openings formed in the draw bar and a pin element for locking said link relative to said draw bar and for forming a rigid tractor hitch.

Des Moines, Iowa, September 1, 1927.

MARTIN T. KAMERICK.